United States Patent [19]

Kelly

[11] 4,220,870
[45] Sep. 2, 1980

[54] WIND CONVERSION LATTICE ARRAY, WITH MULTIPLE MINI-TURBO-GENERATOR MODULES

[76] Inventor: Donald A. Kelly, 58-06 69th Pl., Maspeth, N.Y. 11378

[21] Appl. No.: 918,062

[22] Filed: Jun. 22, 1978

[51] Int. Cl.³ ............................ F03D 9/00; H02P 9/04
[52] U.S. Cl. ........................................ 290/44; 290/55
[58] Field of Search ...................... 318/44, 55; 343/882

[56] References Cited

U.S. PATENT DOCUMENTS

| | | | |
|---|---|---|---|
| 1,364,472 | 1/1921 | Andrews | 290/44 UX |
| 1,876,595 | 9/1932 | Beldimano | 290/55 XR |
| 2,804,950 | 9/1957 | Leslie, Jr. | 343/882 |
| 3,426,214 | 2/1969 | O'Malley | 290/55 |
| 3,713,503 | 1/1973 | Haan | 290/44 X |
| 3,721,290 | 3/1973 | Butler | 290/44 |

*Primary Examiner*—B. Dobeck

[57] ABSTRACT

The wind conversion lattice array, with multiple, mini-turbo/generator modules consists of multiple miniature turbine wind generator modules which are uniformly mounted on an open lattice-like framework structure on a building rooftop or other suitable raised structure.

The identical turbine impellers are multi-vaned units of about 6 inches to ten inches in diameter, and directly coupled to matching miniature D.C. electric generators or dynamo os located directly above each turbine impeller. Each of the turbo/generator modules is mounted on the horizontal members of the lattice framework structure.

Any number of turbo/generator modules may be utilized on the lattice framework, up to about one hundred units for practicality, with the framework oriented in any direction to suit rooftop conditions. The framework is hinged at the base for quick lowering during violent storm conditions, and held in an upright position by folding, diagonal arms.

6 Claims, 4 Drawing Figures

WIND CONVERSION LATTICE ARRAY, WITH MULTIPLE MINI-TURBO-GENERATOR MODULES

BACKGROUND OF THE INVENTION

Considerable effort has been expended on the design and development of various types of conventional and unconventional wind conversion devices and systems over the years. Units from about six foot in diameter to the present very large 125 foot diameter rotor wind turbines are now in operation for both public and private auxiliary power requirements.

Even larger wind conversion machines are being planned by the D.O.E. to the complete exclusion of other more practical and viable wind conversion concepts, and decentralized homeowner installations. Aside from being generally cost-ineffective, these large diameter wind conversion installations are subject to excessive vibration caused by unequal wind velocities at different elevations, high maintenance and repair costs caused by violent storm conditions.

The example set by the rotor blade failure of the Smith-Putnam wind turbine at GrandPa's Knob, Vermont in 1945, is apparently being ignored by present D.O.E. planners, so that it is probable that there will be more major breakdowns in these giant wind machines in the future. The trend toward even larger wind conversion machines by the D.O.E. is very wasteful, while serving only the limited power needs of local areas.

A concerted effort in the other direction, namely:—toward much smaller size units which are ganged together in great numbers in uniform arrays could probably lead to far greater operating cost/effectiveness and reduced installation time and total costs.

The use of vertical axis turbine types of wind impellers is generally desirable due to the ability of these receiving wind energy from any direction which eases installation requirements, along with the elimination of slip-ring electrical transfer requirements of the horizontal wind generator units. Another advantage to utilizing greatly reduced size wind conversion units is that standard, off-the-shelf components may be used without special and costly custom hardware usually required for the larger installations.

All of the giant wind turbine machines require costly towers and/or support structures which greatly add to the final installation costs, without improving the basic operating performance of the wind power system. The large, centralized wind conversion installations also require large transmission towers which tie into the utility power grid for the locality of the auxiliary power site.

Miniature wind turbines in great numbers and small wind power machines offer a far greater potential for supplementary energy for individual homeowners and apartment dwellings, on a decentralized alternate energy basis.

The following issued U.S. patents generally relate to this present miniature wind turbine art: Nos.
595,500—Blain
1,808,874—Wilson
1,812,400—Gilley
1,460,114—Shelton
3,859,882—Moyer
4,017,205—Bolie
4,021,135—Pederson
4,025,233—Moran.

SUMMARY OF THE INVENTION

The wind conversion lattice array with multiple miniature vertical turbo-generator modules is comprised of identical turbine type, multi-vane, shaped impellers mounted on a vertical shaft within sealed ball bearings fixed to a horizontal member of the framework. The identical small turbo-impellers are connected to correspondingly small D.C. electric-generators directly above each impeller, within an open, lattice-like framework structure.

The turbine impellers and their matching generators are arrayed in uniform rows and columns, with each unit, impeller and generator secured to a horizontal member of the squarish cross-pattern framework. The impellers and generators may be quickly installed and removed independently from each other, with a quick connect coupling providing a positive rotation means.

The identical multi-vane impellers will be about six to ten inches in diameter and coupled to the electric generator above each impeller. Sets of two sealed and/or housed ball bearings are secured to a horizontal member of the framework which supports a shaft fixed to the impeller, so that it freely revolves on its vertical axis. Each small generator is covered with a protective housing against the weather/elements, and both the generator with its housing are secured to the horizontal framework member.

While a 6" to 10" diameter impeller is suitable for most home installations, the mini-turbo/generator concept is not limited to any specific range of diameters and heights.

The entire lattice-like framework may be hinged at the roof surface so that it may be lowered in the case of severe storms which may seriously damage the mini-turbo/generator ors and theirs mountings. Since the turbine impellers will be revolved by wind flow from any direction, similar to an anemometer, the direction of the framework installation on the roof surface is not important, and the framework may be installed to suit the rooftop features and obstructions. The lattice framework must be locked in a vertical position with diagonal struts which are pivotable and secured at the roof-surface.

The most effective shape and proportions for the impeller vanes must be evolved from successive testing and modifications, with a linear "V" or "U" cross-section shape being the basis for the optimum cross-section. The width of the vertical, shaped vanes must not exceed one-third the radius of the impeller, with this general width being close to an optimum proportion for the vane width to impeller diameter ratio. A symmetrical airfoil shaped cross-section should be close to an ideal impeller vane shape within the width limits stated above. The height of the impeller vanes should be about equal to the impeller diameter, although there is no actual restriction on the vane height except for the practical limits of the span between ball bearings.

The complete impeller assembly will consist of about six to ten shaped vanes which are secured to identical upper and lower discs with a suitable shaft fixed to both discs. Since the impeller assembly must be rigid and durable it will be necessary to utilize a tab and slot arrangement for the joining of the vanes and discs, and a subsequent bonding means to insure that each vane is secured to the two discs. The impellers must also be statically and dynamically balanced.

The D.C. electric generators used for this alternate energy application are actually small dynamos which are marketed as small D.C. motors for toys, etc., but will perform as dynamos, either to run as a motor or to produce a small E.M.F. when the shaft is revolved steadily. These tiny dynamo units are inexpensive and may be joined together in two or more units with one impeller to provide a matched impeller/generator module. Another design variation possible is that of placing several mini-generators around the periphery of an impeller in direct contact with the upper disc. Small wheels would be fixed to each generator shaft so that a speed stepup would be provided for the multiple mini-generators.

A further design variation for the arrangement would be the direct mounting of the impeller onto the generator shaft which would be applicable to larger dynamo/generator units.

The multiple mini-D.C. generator arrangement allows flexibility in the output wattage rating, in that the units may be be connected in groups of series and parallel circuits for useable and convenient current and voltage output combinations.

The small size of both the turbine impeller and D.C. mini-generators allows for the quick replacement of inoperative ve components, and the convenient repair and replacement of associated hardware and components.

The open lattice-like framework consists of standard aluminum structural shapes such as tubing, channels or angle sections which are bolted together into uniform rows and columns. The vertical members must be slightly larger and stronger than the horizontal members since they must bear the total weight of all the min-turbo/generator modules plus the horizontal members. Aluminum tubing is a nearly ideal structural shape for the open framework since it offers minimum wind resistance and therefore will not disrupt air flow over each of the multiple mini-turbo/generators. The design of the open framework can be flexible with the framework arrangement comprised of several sections, with each section limited to carrying no more than about twenty-five mini-generator modules.

It is important that the mini-D.C. generators be protected from the elements, and are therefore mounted with their shafts placed downward with the units fully covered with a plastic housing or other suitable complete housing. The electric wiring must also be fully protected from the weather and must be routed into protective tubing down the vertical framework members, and to a connection box on the roof surface.

Several other objectives, features and advantages of this present invention will be more fully understood and explained from the following description when taken in conjunction with the accompanying drawings with their reference numerals. It should be understood that variations may be made in the details and general features of the design concept without departing from the spirit and scope of the invention.

Several Disclosure Documents have been filed with the Office which describe the present invention and its variations:

No. 071,581  Mini-Turbine Wind Generator Array
No. 058,643  Concentrating Wind Turbine
No. 060,609  Vertical Wind Turbine

REFERRING TO THE DRAWINGS

DESCRIPTION OF THE PREFERRED EMBODIMENT

Figure 1:
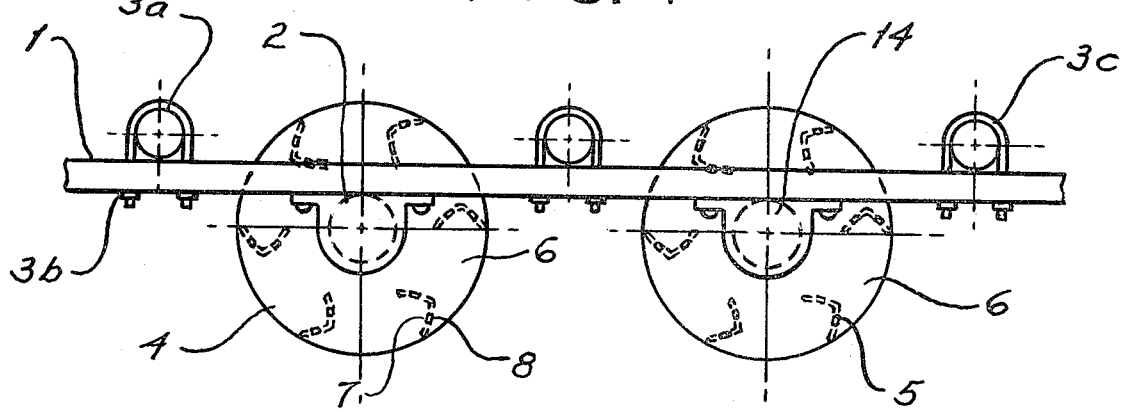
FIG. 1 is a plan view of the wind conversion lattice array, with multiple mini-turbo/generator modules
Figure 2:
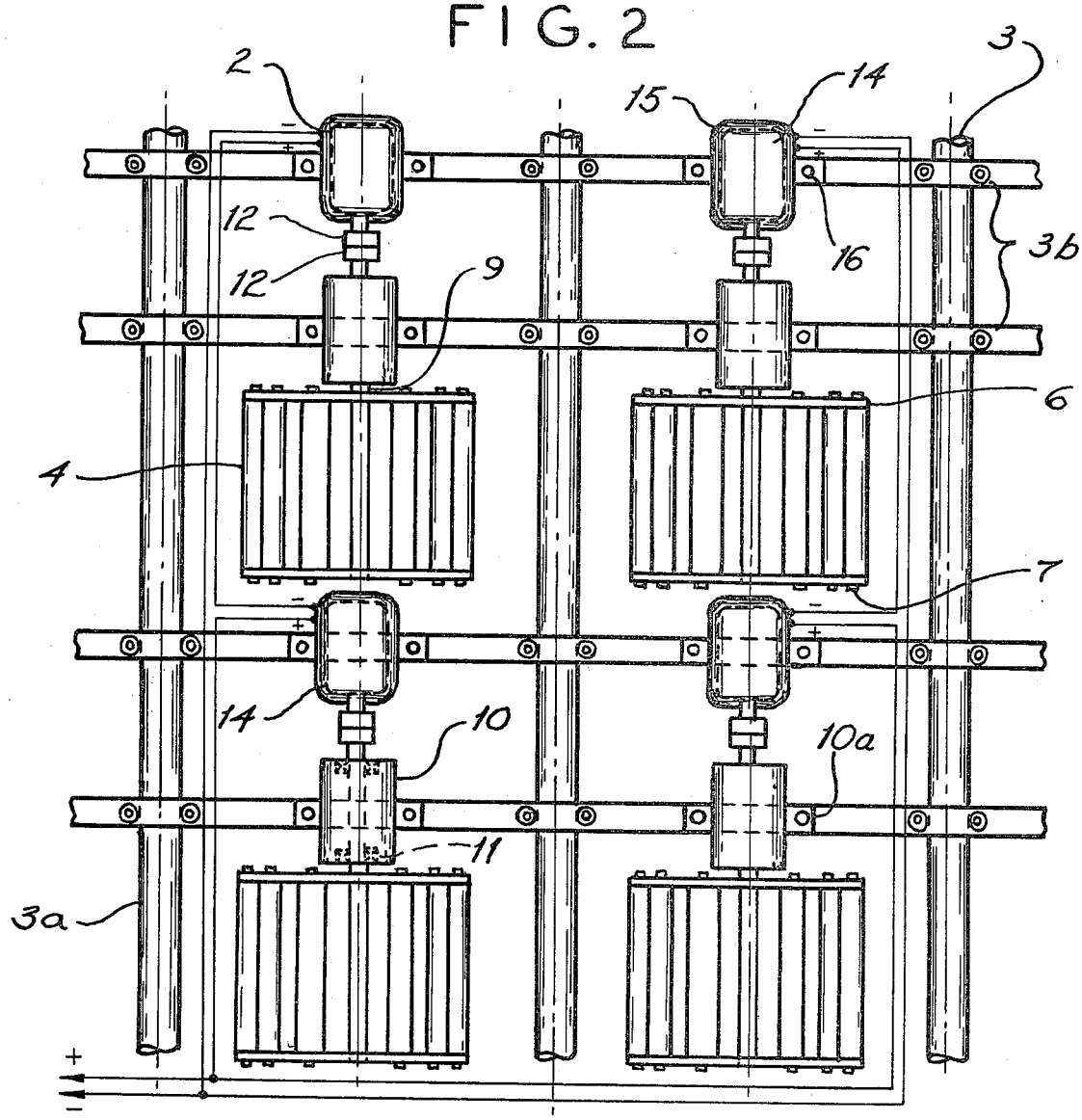
FIG. 2 is an elevation view of the wind conversion lattice array, with multiple mini-turbo/generator modules.
Figure 3:
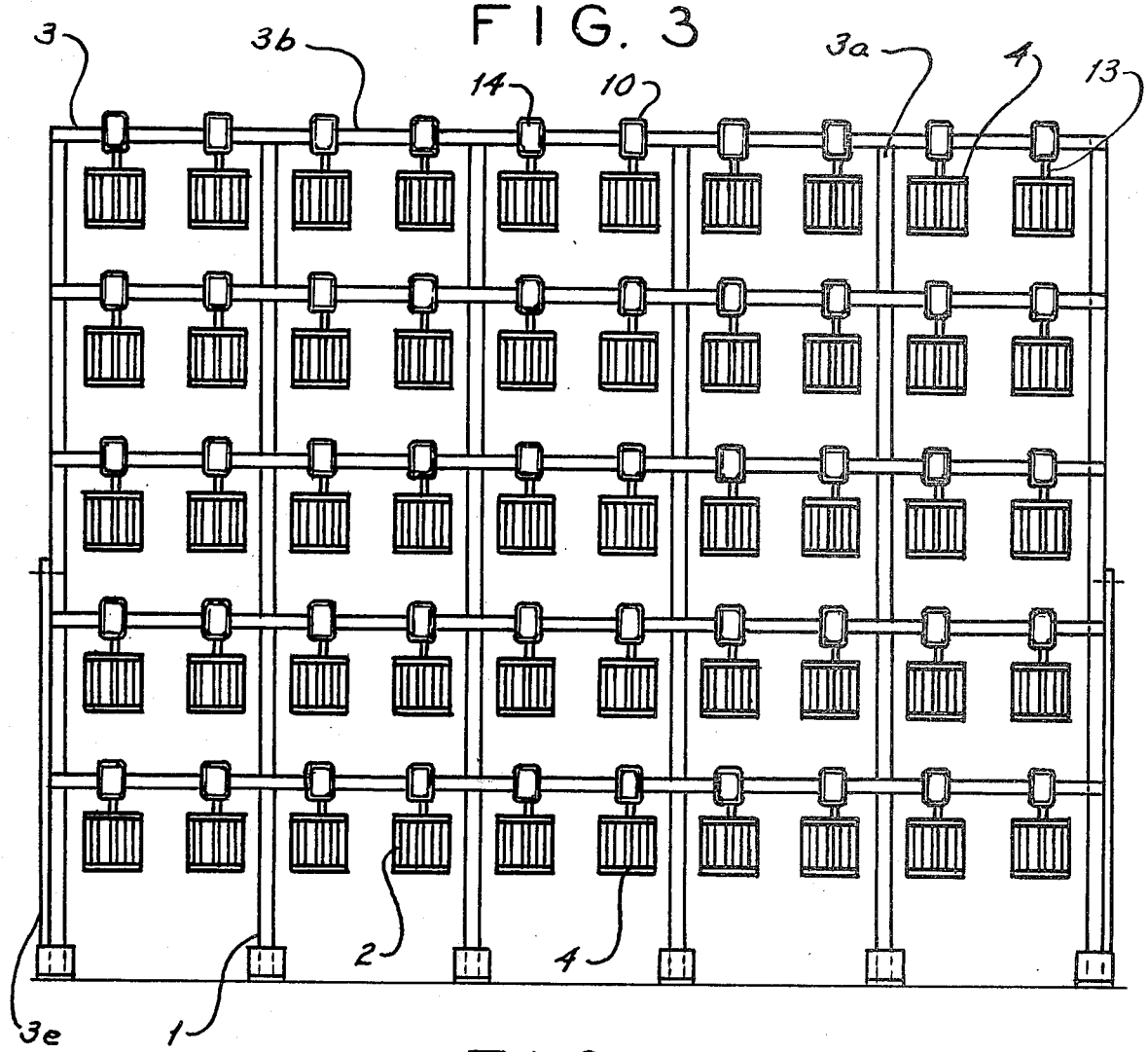
FIG. 3 is a full face view of the wind conversion lattice array, with multiple mini-turbo/generator modules.
Figure 4:
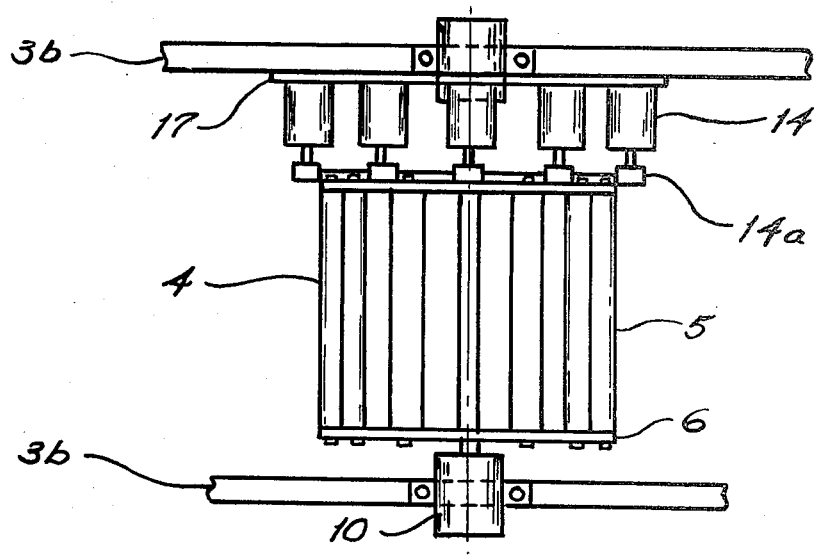
FIG. 4 is an alternate arrangement of the wind conversion lattice array, with multiple mini-turbo/generator modules.

Referring to the drawings, numeral 1 illustrates the assembled wind conversion lattice array, with multiple identical turbo/generator modules 2, secured to the open lattice framework 3. The open lattice framework 3, is comprised of multiple, identical vertical support members 3a, and multiple, identical horizontal members 3b, joined together with suitable clamps 3c, and standard hardware. Several hinges 3d, are located at the base of the framework 3, which allow the assembled wind conversion lattice array to be lowered as required, while the diagonal struts 3e, hold the assembly 1, in an upright, vertical position.

The multiple, identical turbo/generator modules 2, are comprised of an impeller assembly 4, consisting of multiple shaped vanes 5, and two identical end discs 6. The multiple shaped vanes 5, are equally spaced around the peripheral portion of the discs 6, and secured to each disc by end tabs 7, which fit into corresponding slots 8, within each of the end discs 6. The exposed portion of the end tabs 7, are bonded to each disc to maintain a rigid impeller assembly 4. The shaped impeller vanes 5, and two end discs 6, must be fabricated of plastic or aluminum to withstand the effects of prolonged exposure to the elements.

A centrally positioned shaft 9, is secured to both end discs 6, with one end protruding and supported by a closed housing 10, containing two ball bearings 11. A multi-jaw type of coupling half 12, is pinned to the end of the shaft 9. An identical matching coupling half 12, is secured to the shaft 13, of the small D.C. generator 14.

The closed housing 10, has two mounting lugs 10a, which are required to mount the housing 10, to the horizontal member 3b, with standard hardware. Each of the small D.C. electric generators 14, must be covered with a protective hood or housing 15.

Some small D.C. generators 14, have mounting lugs, while some do not, and will therefore require a mounting clamp 16, which is secured to the horizontal members 3b, with standard hardware.

A design variation of the basic wind conversion lattice array 1, the multiple small D.C. generators 14, would be uniformly located around the periphery of the upper end discs 6, of each impeller assembly 4. Each small D.C. generator 14, is fitted with small plastic wheels 14a, which are maintained in close contact with the upper end discs 6. A mounting ring 17, is required to support each D.C. generator, and is secured to the horizontal members 3b, with standard hardware.

For wind conversion lattice arrays 1, where larger D.C. generators 14, are used which contain suitable bearings, the impeller assembly 4, may be mounted directly on to the generator shaft 13. In this type of array 1, the closed housing 10, and the coupling halves 12, are not required.

What is claimed as new is as follows:

1. An array of identical miniature wind turbine/generator modules, the combination comprising an open framework lattice support structure, a plurality of miniature vaned turbine impellers directly coupled to corresponding small D.C. electric generators, said miniature vaned turbine impellers comprised of a plurality of concave linear vanes vertically disposed and secured to an upper and lower disc adjacent to the outer periphery of said discs, a centrally disposed shaft fixed to each of said discs protruding from an end of one of said discs,
   a coupling half secured to the protruding end of said shaft, a bearing housing containing two miniature ball bearings fitted over said shaft, said bearing housing fastened to a horizontal member of said open framework lattice support structure,
   mounting means for said small D.C. electric generators for securing to a horizontal member of said open framework support structure,
   a coupling half secured to the shaft end of said small D.C. electric generators, protective housings disposed over said small D.C. electric generators and mounted with said small D.C. electric generators,
   connection of all electrical wires from said small D.C. electric generators into useful series and parallel circuitry for connection to the household load,
   hinge means at the base of said open framework lattice support structure, diagonal pivoting support struts for maintaining said open framework lattice support structure in an upright position.

2. An array of identical miniature wind turbine/generator modules according to claim 1, wherein said plurality of concave linear vanes are of symmetrically curved "U" cross-section with thin and lightweight wall thicknesses,
   uniform squarish tabs disposed at both ends of said concave linear vanes, corresponding and close fitting slots disposed in said upper and lower discs, joining of said tabs into said slots of said upper and lower discs, bonding means for securing said tabs within said slots,
   static and dynamic balancing of said miniature vaned turbine impellers.

3. An array of identical miniature wind turbine/generator modules according to claim 1, in which said open framework lattice support structure consists of a plurality of horizontal members formed of tubular aluminum alloy,
   a plurality of vertical members formed of a larger diameter tubular aluminum alloy,
   uniform rows and columns of horizontal and vertical members comprising said open framework lattice support structure,
   clamp and standard hareware means for securing said plurality of vertical and horizontal members comprising said open framework lattice support structure,
   base brackets for securing said open framework lattice support structure to a roof surface.

4. An array of identical miniature wind turbine/generator modules according to claim 1, wherein said plurality of miniature vaned turbine impellers are directly connected to the shaft of said corresponding small D.C. electric generators,
   mounting of said small D.C. electric generators to said horizontal members of said open framework lattice support structure,
   mounting means for said small D.C. electric generators,
   durable bearings within said small D.C. electric generators for the direct connection of said miniature vaned turbine impellers.

5. An array of identical miniature wind turbine/generator modules according to claim 1, in which said plurality of miniature vaned turbine impellers are formed in one unit from durable plastic material,
   a metal shaft centrally disposed and embedded within said id miniature vaned turbine impeller,
   a protective housing for said small D.C. electric generator formed in one unit from durable plastic material,
   said bearing housing containing two miniature ball bearings formed in one unit from durable plastic material.

6. An array of multiple miniature wind turbine generators modules comprised of a plurality of miniature vaned turbine impellers,
   said miniature vaned turbine impellers have vane widths that do not exceed one-third the radius of said miniature vaned turbine impellers,
   said miniature vaned turbine impellers disposed on a vertical axis with a plurality of "V" cross section linear vanes of thin and lightweight wall thickness,
   said miniature vaned turbine impellers have a height of not less than the diameter of said miniature vaned turbin bine impeller nor greater than the allowable span between said the horizontal members of an open framework lattice support structure,
   an open framework lattice support structure comprised of uniform rows and columns of horizontal and vertical members disposed as a criss-cross pattern,
   said uniform rows and columns of horizontal and vertical members formed from standard aluminum alloy structural shapes,
   connection of all electrical wires from said small D.C. electric generators coupled with said miniature vaned turbine impellers into convenient series and parallel circuits for connection to the building load,
   an electrical connection box disposed on the roof surface for said electrical wires.

* * * * *